United States Patent

[11] 3,616,924

[72] Inventor Kenneth L. Sanborn
  Walnut Creek, Calif.
[21] Appl. No. 64,115
[22] Filed July 30, 1970
[45] Patented Nov. 2, 1971
[73] Assignee B. D. Bohna & Co.
  San Francisco, Calif.
  Continuation of application Ser. No.
  721,240, Apr. 15, 1968, now abandoned.

[54] FILTER APPARATUS
  2 Claims, 7 Drawing Figs.
[52] U.S. Cl.................................................. 210/284,
  210/291
[51] Int. Cl...................................................B01d 23/12,
  B01d 23/16
[50] Field of Search......................................... 210/80,
  266, 275, 277, 279, 282, 283, 284, 289, 291, 323,
  333, 484

[56] References Cited
UNITED STATES PATENTS

| | | | |
|---|---|---|---|
| 183,599 | 10/1876 | Sinclaire...................... | 210/283 |
| 753,453 | 3/1904 | Voindrot et al.............. | 210/266 |
| 2,075,300 | 3/1937 | Pflanz........................... | 210/80 |
| 2,358,748 | 9/1944 | Thompson..................... | 210/484 X |
| 3,312,349 | 4/1967 | Rosaen......................... | 210/283 |

Primary Examiner—Samih N. Zaharna
Attorney—Fryer, Tjensvold, Fiex, Phillips and Lempio ABSTRACT: The filter employs a mass of finely divided particulate matter, such as sand, as the filtering medium. Longitudinally extending channels are formed in the filter bed so as to divide it into a plurality of relatively narrow segments and the liquid to be filtered enters into the filtering segments from the channels. In a modified form of the invention drainage channels are also provided intermediate the feed channels so that the liquid to be filtered passes from the feed channels, through filter segments of substantially uniform thickness and then out the drainage channels.

INVENTOR.
KENNETH L. SANBORN
BY John R. Murtha
his ATTORNEY

INVENTOR.
KENNETH L. SANBORN
BY
his ATTORNEY

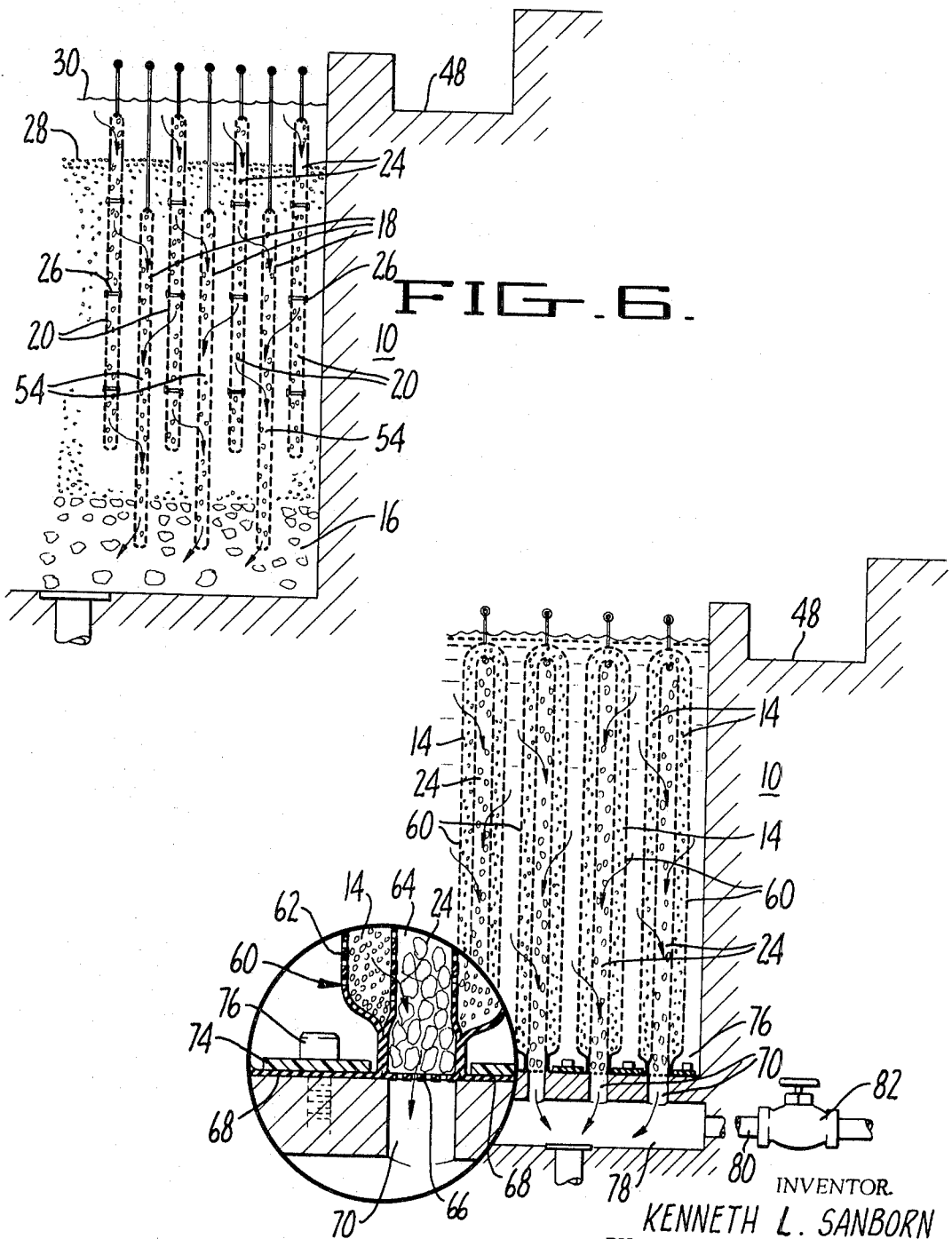

3,616,924

FILTER APPARATUS

This is a continuation of copending application Ser. No. 721,240, filed Apr. 15, 1968 and now abandoned.

The invention relates to filters which employ a mass of finely divided particulate matter, such as sand and other like materials, as the filtering medium.

The invention has for its object the improvement of such filters so as to provide the capacity for filtering, at high capacities, liquid carrying large amounts of extremely small-sized particles.

A number of presently preferred embodiments of the invention are shown in the accompanying drawings and these will be described in detail hereinafter for the purposes of illustrating how the invention may be practiced. It is to be understood, however, that the following description are by way of example only and are not intended to define or restrict the scope of the invention; the claims appended hereto, together with their lawful equivalents, are relied upon for that purpose.

IN THE DRAWINGS:

FIG. 6 is another view similar to FIG. 2 showing an alternate filter apparatus construction; and FIG. 7 is another view similar to FIG. 2 showing still another alternate construction.

Figure 1:
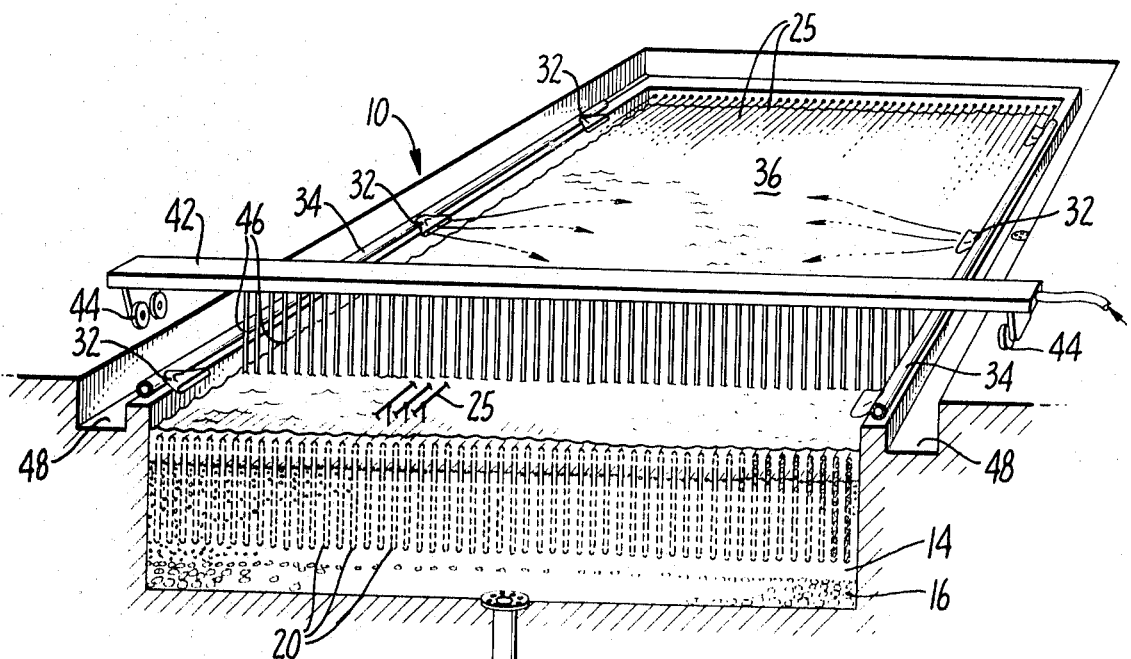
FIG. 1 is a perspective view, partly in section, showing a filter apparatus constructed in accordance with the teachings of the invention.

Referring first to FIG. 1, the filtering apparatus shown therein generally comprises a rectangular container or tank 10 which houses the filter medium 14. The filter medium comprises a mass of finely divided particulate matter 14, preferably sand. In addition to sand, the particulate filtering media may comprise powdered anthracite or other carbonaceous material, lead dust, powdered glass, or any other such suitable material which may be chosen to suit a particular filtration task. The container or tank 10 may, in a simple version, comprise a concrete basin of suitable shape and proportions. Customarily filter apparatus employing sand or other particulate matter dispose the filter medium in horizontal beds particularly where relatively large quantities of liquid are to be filtered, and it is preferred to have the filter medium in the present invention disposed in a generally horizontal bed. If desired, however, the filter medium may be otherwise disposed as long as such disposition does not prevent the washing or regeneration of the filter medium. The invention readily lends itself to many alternative arrangements particularly where the filter is employed in a pressure system as opposed to a gravity or vacuum system. Steel or other more corrosion resistant materials may be used for the container or tank or alternatively the concrete basin may be lined with corrosion resistant material if the liquid to be filtered is of a corrosive character.

The finely divided sand 14 making up the filtering part of the bed is placed on top of a layer of coarse sand or gravel 16 placed in the bottom of the tank or basin 10. In preferred form of the invention shown, the depth of the basin or tank is on the order of approximately 30 inches while the width of the tank is about 10 or 12 feet and the length of the tank or basin is about 20 feet. There is nothing critical about these dimensions and they may be varied as desired.

The coarse rock or sand 16 occupies the bottom 6 or 8 inches of the basin 10 and the particle size of the coarse rock or sand is graduated so that particle size increases as the bottom of the tank is approached. The size of the rock or sand particles is such that the spaces therebetween are sufficiently large as to offer negligible resistance to the flow of liquid therethrough. Very fine sand 14 is placed on top of the coarse rock or sand 16 to a desired depth as is more fully described hereinafter. An important feature of the invention is that very fine sand particles are used as the filtering medium and the particle size is selected so as to give a shallow filtering action in the sand. In the usual sand filter type of apparatus, it is common to select the particle size of the sand such that filtration occurs in depth. Filtration in depth means that filtration occurs for a significant distance into the filter sand. In some municipal water sand filtering apparatus, filtration may occur to a depth of 18 inches or more into the sand. The present invention, however, contemplates a shallow filter zone in the sand. Accordingly, very small sized sand particles are used so that all, or substantially all, filtration occurs very close to the surface of the filter sand rather than to any significant depth.

Figure 2:
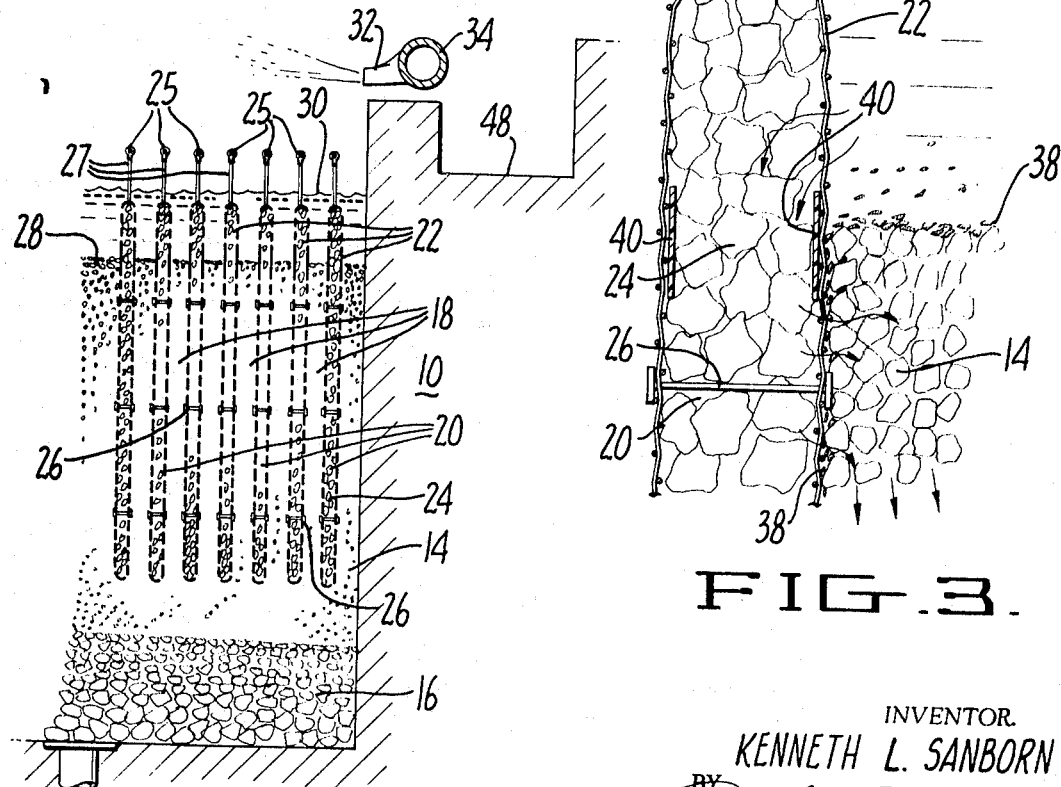
FIG. 2 is an enlarged sectional view showing details of the apparatus shown in FIG. 1.
Figure 3:
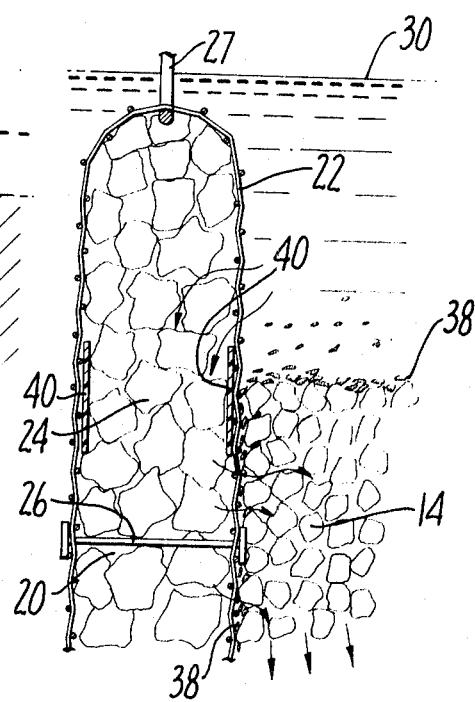
FIG. 3 is a greatly enlarged view of an area of the filter bed adjacent to one of the envelopes.

In accord with the teachings of the invention, the very fine sand particles 14 making up the filtering medium are divided into a plurality of substantially vertically disposed segments 18, 18. As shown in FIGS. 1 and 2, one manner in which this may be done is by forming a plurality of channels 20, 20 in the filter sand that extend longitudinally of the basin or tank 10. An economical form of channel 20 comprises a cloth membrane or envelope 22 filled with sand or rock 24 that is coarser in size than the filter sand 14. The cloth membranes or envelops 22, 22 extend throughout the length of the filter sand but terminate short of the end walls of the tank 10, 14 and are relatively narrow in cross section. Positioning of the envelopes 22, 22 in the filter bed 14 may be effected in any suitable way. One way is to string cables 25, 25 longitudinally of the tank or basin 10 above the filter media and to hand the envelops from the cables 25, 25 by means of stringers 27, 27. Adjacent envelops 22, 22 are disposed in spaced, generally parallel relationship and extend downwardly into the filter sand 14 to a point short, but in the general vicinity, of the top of the coarse rock or sand 16. In this way the envelops 22, 22 serve to partition the sand filter bed into a number of substantially vertically disposed segments 18, 18.

The envelopes 22, 22 are formed from a porous medium and the preferred medium is cloth although other materials can be used also. Since the function of the envelopes is to serve as a channel for the flow of liquid, the size of the coarse rock 24 is large enough that sufficient spaces are provided to pass the liquid with a minimum of flow resistance. At suitable points the opposite sides of the envelops are interconnected or otherwise tied together by ties or stays 26, 26 so as to maintain the sides of the envelopes 22, 22 in substantially parallel relationship and to prevent any bulging of the envelopes which might other wise occur from the weight of the coarse rock or sand 24. Obviously, the coarse rock or sand 24 in the envelopes can be omitted if some other means are provided to keep the channels open. The use of coarse sand or rock is an economical means of maintaining the channels open and in an upright position.

As will be seen by reference to FIG. 2, the upper portions of the envelopes extend above the top surface 28 of the filter media bed 14 so as to provide the liquid to be filtered with ready access to the interior of the filter bed. The unfiltered liquid 30 is discharged onto the top of the filter bed through the spray nozzles 32, 32 in the feed conduits 34, 34 so as to form a pond 36 on the top surface 28 thereof. It then enters the top portions of the channel envelopes 22, 22 and passes downwardly through the channels into the interior of the filter bed 14. After the liquid passes downwardly into the envelopes 22, 22 and laterally into the filter sand 14, it passes downwardly to the drainage area 16 at the bottom of the bed 14. As it passes through the filter sand 14 the extremely fine solid particles carried by the liquid are filtered out by the sand, and the clarified liquid is collected at the bottom of the bed and conducted to a desired collection point.

Because of the shallow filtering action of the filter sand, the particles being filtered collect along, or closely to, the surface of those areas of filter sand in contact with the feed liquid. Consequently, a filter cake 38 builds up along the filtering surfaces of the sand 14. The filter cake 38 forms at the upper surface 28 of the filter sand 14 between adjacent channel envelopes 22, 22. The filter cake 38 also forms along the vertical interfaces between the sand 14 and the sides of the channel envelopes 22, 22. In some applications it has been found desirable to construct or position a barrier 40, 40 in the envelopes laterally opposite the top surface 28 of filter sand to prevent the filter cake 38 formed at the top surface of the filter sand from forming across the envelope 22. The barrier 40, 40 may take any suitable form. For example, the barrier may comprise impervious strips positioned in the envelope laterally adjacent the top surface of the sand or may be constructed by forming the envelope itself with an impervious section at the point where the top of the sand contacts the envelope.

The utilization of the channels 20, 20 is important in the operation of the filter since the channels deliver the liquid to be filtered to the surface of the filter sand 14 and its immediate environs where the principal degree of filtration takes place. The porous rock-filled envelopes 22, 22 making up the channels 20, 20 may take varied forms. For example, such channels could be provided in mechanical form but for reasons of simplicity and cost, it is preferred to use some suitable particulate medium such as ceramic, stone, glass or coarse sand.

The dimensions of the channels 20, 20 are governed by the amount of flow that is desired therethrough. It is desirable, of course, to make the channels as thin as possible commensurate with the requirement that the flow area thereby provided is sufficient as to impose relatively little resistance to liquid flow.

The mesh size of the coarse particles 24, 24 making up the channels 20, 20 is chosen sufficiently large that there is little tendency for the unfiltered feed liquid to establish filter cake bridges between adjacent particles in the envelope. If the particle size of the coarse sand or rock is not sufficiently large as to discourage the formation of these filter cake bridges, such a filter cake may extend and build up to the point where a significant portion of the channel may be partially or totally blocked to the passage of the feed liquid. This will reduce the flow rate of the liquid through the filter. Accordingly, the particle size of the material used in the envelopes must be of a size range and must have a tendency to pack in such a way that the intersticial spaces—the void spaces available to pass the liquid—are relatively large with respect to the size of the particles to be separated from the liquid being filtered.

Ordinarily, the channels 20, 20 are fed in the simplest way by flooding the upper surface 28 of the filter bed 14. Flooding the upper surface of the bed permits the feed liquid to enter into the upper portions of the channel envelopes 22, 22 that extend above the upper surface of the filter sand 14. If desired, however, the channels 20, 20 may be positively fed by providing a closed surface above the top of the filter bed and pumping the feed liquid into the channels under positive pressure. Alternatively, a vacuum may be applied to the downstream side of the filter bed so as to increase the flow rate of the liquid through the filter bed.

As stated, the porous membrane used as the envelope for the coarse rock or sand may comprise any suitable cloth membrane. The material of the cloth should be such as to resist damage from exposure to the liquid being filtered. Preferably, the cloth membrane will be formed from a suitable plastic membrane. The function of the cloth membrane is to maintain in place the coarse particles 24, 24 making up the channels 20, 20. It is not intended to have any significant filtering function. Experience with the filter apparatus of the present invention has shown that effective filtration of the feed liquid does not depend upon the presence of a cloth membrane between the coarse sand 24 in the channels 20, 20 and the filter sand 14.

However, the membrane does support and maintain the coarse sand or rock in close proximity to the filtering surfaces of the filter sand and it is possible that some complementary function or interaction does occur between the sand or rock in the envelope, the envelope itself and the filter sand. Whatever this effect may be, it is preferred to select the particle size of the sand or rock in the channels such that the major, if not complete, portion of the filtering action occurs in the filter sand. Accordingly, the weave of the membrane is preferably chosen so that the solid particles in the liquid being filtered will all substantially pass the weave of the cloth. If the weave is made too tight, the filter quickly plugs off, resulting in a very short filtration cycle. The weave should be sufficiently coarse as to provide open interstices capable of passing the solid particles in the liquid being filtered without causing the formation of filter cake bridges. Nevertheless, the intersticial spaces of the cloth membrane should be sufficiently small as to minimize the passage of fine sand particles from the filter bed into the envelope.

The sand 14 or other particulate matter used to make up the filter bed must be sufficiently fine that when the liquid being filtered encounters the vertical faces of the filter bed segments 18, 18 the solid particles being filtered out of the liquid will tend to lodge on the surface of the filter sand. The size range of the filter sand particles must be sufficiently uniform that no gross degree of classification results when the filter bed is roiled or fluidized during the washing cycle. If the filter sand is to be washed in place, the finest particles of the filter sand should be of sufficiently greater size than the coarser solid particles being filtered out that upon backwashing of the filter bed there will not be undue loss of the fine filter sand particles as a result of their being slurried up in the wash fluid and carried out of the tank or basin. The specific gravity of the filter sand particles should preferably exceed the specific gravity of the liquid being filtered as well as the specific gravity of the wash fluid and the specific gravity of the particles being filtered. Otherwise, the filter sand particles will tend to float out of position. If desired, the entire filter bed may be slurried off and new or recovered filter sand brought in each time it is necessary to regenerate the filter bed.

In selecting a porous membrane for the envelopes, it is preferred that a monofilament cloth be used since a multifilament weave in the cloth will tend to cause a buildup of particles at the interstices because of the relatively more tortious character of the openings in the multifilament cloth. A monofilament cloth will, therefore, be less likely to induce the buildup of filter cake bridges across the openings in the membrane. The monofilament cloth also has the advantage that it can be more easily and freely washed of any lodged particles than can a multifilament cloth. It also offers less resistance to liquid flow. The cloth should also be as abrasion resistant as possible in order to withstand the abrasive effects of the particulate matter used both in the channel envelopes and in the filter bed. The particles in the envelopes and in the filter bed move violently when the filter bed is fluidized and roiled during the washing cycle.

Additionally, the membrane must be mechanically strong enough to permit the hanging of the envelopes with a minimum of supporting members, to permit the interconnection of the opposite sides of the envelopes with a minimum of fasteners or other types of staying means and to resist mechanical damage during operation of the filter. Finally, the membrane must be corrosion resistant and, if plastic, must be sufficiently resistant to swelling and other similar damage to give satisfactory functional life. Material such as polypropylene, polyethylene, Teflon, dacron, natural fibers, and various metals or alloys may be used as the material for the cloth membrane.

The positioning of the envelopes 22, 22 within the filter bed 14 is not critical, but certain considerations must be taken into account to insure proper flow of the liquid through the filter apparatus. The filter sand 14 has a finite capacity to pass filtered liquid under a given pressure drop. In order not to exceed the capacity of the filter bed to pass the desired rate of liquid, the depth to which the envelops 22, 22 extend into the filter bed must be controlled as well as the spacing between adjacent envelopes. Since effective filtration of the liquid occurs at the vertical interfaces between the coarse sand or rock 24 in the envelopes 22, 22 and the fine sand 14 of the filter bed segments 18, 18, the depth to which the envelopes extend into the filter bed determines the amount of liquid passing therethrough inasmuch as the filter bed segments 18, 18 between adjacent envelopes 22, 22 receive filtered liquid that has passed laterally from the channel envelops. The spacing between adjacent envelopes, which determines the width of the filter bed segments, must be sufficiently wide as to permit the segments to pass the amount of liquid flowing down the channels and entering each of the segments of the filter bed. The depth to which the envelopes extend into the filter bed will have a bearing on the amount of liquid passing through the filter since the effective filter area of the apparatus increases as the depth of the channels increases. Increasing the depth of the envelopes, accordingly, increases the capacity of the filter. In designing the filter bed, the proper balance must be observed between the depth of the envelopes and the distance between adjacent envelopes. The depth of the envelopes must be controlled so as not to introduce more liquid into the bed than can be handled by the filter bed segments between envelopes.

Figure 4:
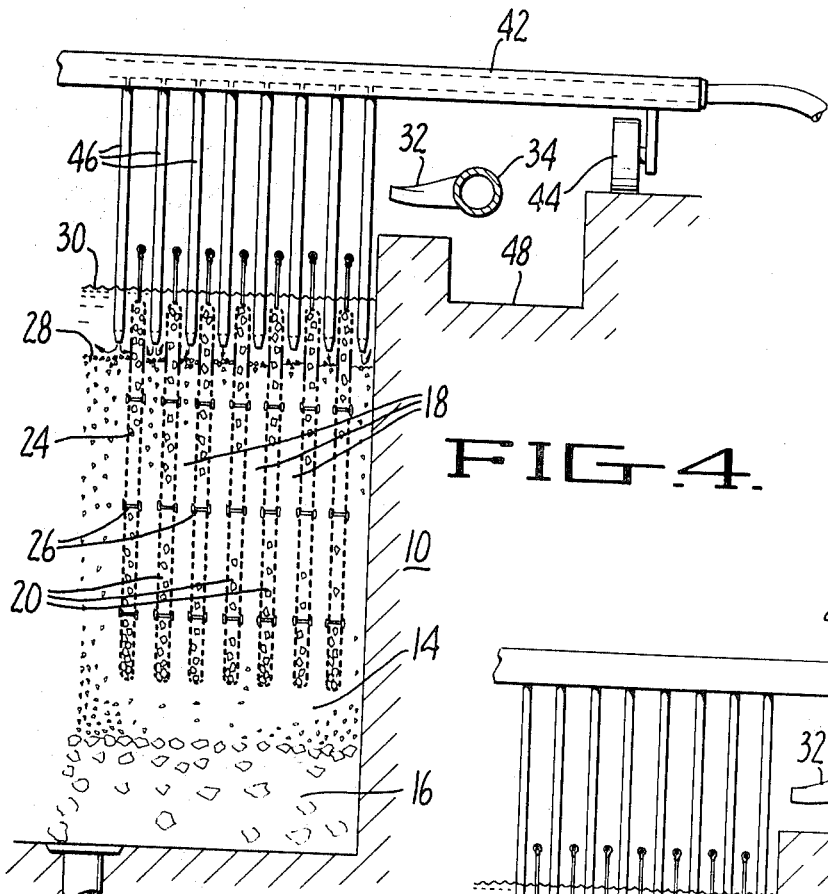
FIG. 4 is a view similar to FIG. 2 showing one-way in which the regeneration of the filter apparatus of FIG. 1 may be accomplished.

As the liquid is filtered, a thin horizontal filter cake 38 builds up at the interfaces between the filter bed 14 and the reservoir of unfiltered liquid 30 and a thin vertical filter cake builds up between the filter bed 14 and the coarse sand or rock 24 in the channel envelopes 22, 22. Gradually as filtration continues, this filter cake will build up to a point where it will tend to block off the flow of liquid through the apparatus. Before it reaches this condition or point, the filter cake is removed in accordance with accepted filter practice so as to regenerate the filtering capacity of the apparatus.

Where it is not necessary to recover any residue of the filtrate left in the filter bed a rinse cycle is not necessary and the regeneration of the bed may be accomplished directly by simply roiling or fluidizing the filter sand 14 so as to break up the filter cake 38. This may be done in many ways. One method of roiling or fluidizing the filter bed is shown in FIG. 4. There the basin or tank 10 is provided with a plurality traveling headers 42, 42 which are connected to a suitable source of water under high pressure. Each header 42 is mounted on wheels 44, 44 and spans the filter bed area. Depending from the header 42 are a plurality of nozzles 46, 46. One nozzle is provided for each segment 18 of the filter sand bed 14 and the length of the nozzles 46, 46 is such that the head of the nozzle is positioned immediately above the normal top surface 28 of the filter sand. Each nozzle discharges a high velocity stream of water into the segment 18 of the filter sand 14 immediately below it and the action of the water jet from the nozzle roils and fluidizes the filter sand 14 in each segment. During the roiling and fluidizing of the bed the filter cake 38 which had built up along the top and side surfaces of the filter sand segments 18, 18 during the filtration cycle, is broken up into small particles. These particles are light enough to be slurried into the water and when enough water is introduced into the basin or tank 10 to overflow the filter bed 14, the filter cake particles are slurried off into the wash water trough 48 formed in the tank along the longitudinal edges thereof. Sufficient headers and nozzles are provided to keep the particles in suspension. After the filter cake has been removed in this manner the water is turned off and the bed drained. During the draining of the bed the filter sand 14 settles to its original position with its filtering capacity regenerated.

Figure 5:
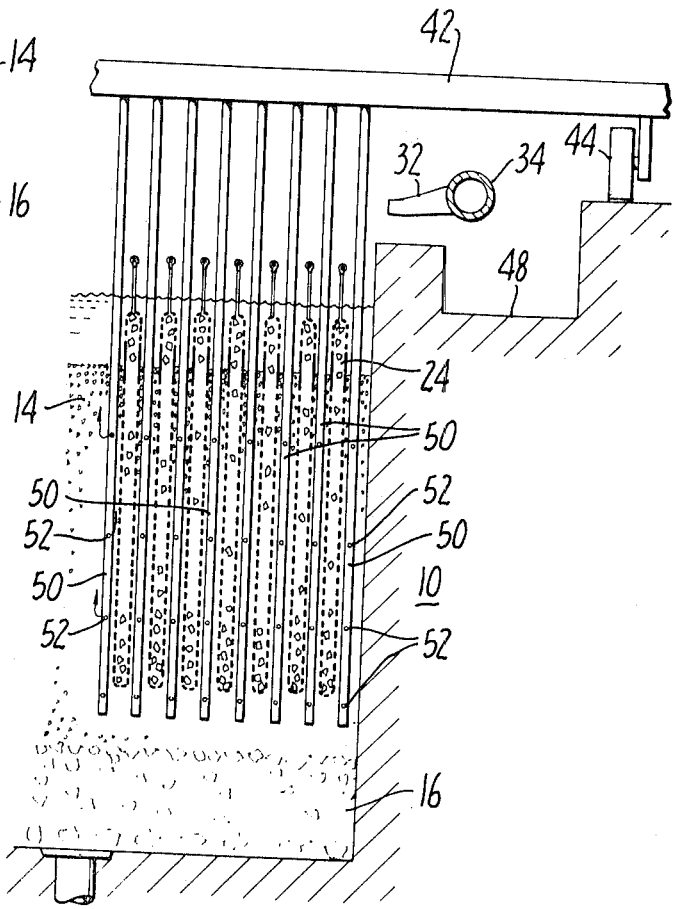
FIG. 5 is another view similar to FIG. 2 showing another way in which the regeneration of the filter bed may be accomplished.

Another alternate form of apparatus for regenerating the filter bed is shown in FIG. 5. In this form of the invention the nozzles depending from the header 42 are replaced by long pipes 50, 50 that extend downwardly substantially to the bottom of the filter sand 14. Each pipe 50 is provided with a number of openings 52, 52 through which small jets issue to roil and fluidize the sand in each of the filter sand segments 18, 18.

It is to be understood that the particular method of washing and regenerating the filter sand bed is optional and, if desired, the filter bed may be washed from below either in whole or in part.

In an alternative form of the invention (shown in FIG. 6) the filter sand 14 is provided not only with channel envelopes 22, 22 but with drainage envelopes 54, 54 as well. The drainage envelopes 54, 54 are constructed in the same manner as the channel envelopes 22, 22 and, like the channel envelopes 22, 22, are filled with coarse rock or sand 24. The drainage envelopes 54, 54, however, are more deeply positioned in the filter sand bed 14. As will be seen from reference to the drawing, the bottoms of the drainage envelopes 54, 54 extend into the coarse rock or sand 16 at the bottom of the basin 10 below the filter sand bed 14 while the tops of the drainage envelopes 54, 54 lie approximately the same depth below the top surface 28 of the filter sand 14 as the bottoms of the channel envelopes 22, 22 lie above the top surface of the coarse sand 16. The channel and drainage envelopes 22, 54 respectively, are alternately positioned in the filter sand bed 14 so that a drainage envelope 54 lies between each pair of adjacent channel envelopes 22, 22.

The inclusion of the drainage envelopes 54, 54 in the filter sand bed 14, improves the uniformity of the flow of the liquid through the filter. In the form of the invention shown in FIGS. 1, 2, 3 and 4, the liquid to be filtered must travel through varying depths of filter sand depending upon the point where the fluid leaves the envelope 22. The fluid leaving the channel envelope 22 adjacent to the top surface 28 of the filter sand 14 must travel downwardly through the entire depth of the filter-sand segment 18, while the liquid leaving the channel envelope 22 adjacent the bottom thereof passes through a much shorter filter sand path. Accordingly, there is less resistance to the passage of liquid adjacent the bottom of the envelope channels than there is adjacent the top. This results in temporary high local flow rates which, in turn, result in poorer filtrate clarity. In the form of the invention shown in FIG. 6, the provision of drainage channels 54, 54 intermediate the channel envelopes 22, 22 provides paths for the liquid through the uniform sand thicknesses over substantially the major portion of the channel envelopes, with the result that the liquid flow from the channel envelopes is more uniform for a greater extent than would otherwise be the case. By increasing the uniformity of liquid flow through the filter the efficiency of the filter is increased. The increase in efficiency results from the elimination of high local flow rates.

It is not essential to the practice of the invention that a large quantity of filter sand be utilized. Due to the shallow filtration effect of the filter sand particles, filtration of the liquid can be accomplished with a minimum amount of sand. In the form of the invention shown in FIG. 7, the filter sand bed is still divided into filter sand segments but in this form of the invention the filter sand segments are incorporated within the envelopes and the areas between adjacent envelopes are left void so as to act as the channels.

As will be seen by reference to the drawing, the filter sand is incorporated into a double envelope 60, 60 that is suspended within the basin or tank 10 in the usual manner. The outer portions 62, 62 of the envelopes are filled with coarse rock or sand 24. The bottoms of the envelopes are provided with a porous web portion 66 which supports the column of coarse rock or sand 24. Each envelope 60 is also provided with lateral flaps 68, 68 of impervious material which are secured to the bottom of the tank 10 adjacent to the drainage openings 70, 70 therein and which serve to seal off the openings 70, 70 from the unfiltered liquid outside of the envelopes. Sealing of the envelopes 22, 22 to the floor or bottom of the basin 10 is done by placing a pressure bar 74, 74 over each of the flaps 68, 68 and applying pressure to the flaps 68, 68 by means of the screws 76, 76. Discharge of the filtrate from the envelopes is through a series of openings 70, 70 formed in the bottom of the tank immediately below the inner coarse rock or sand columns 24, 24. As in the case of the form of the invention shown in FIG. 7, the liquid flow in this form of the invention is through sand paths of uniform thickness.

Regeneration of the filter bed is accomplished by backwashing the filter sand envelopes 22, 22. For this purpose the collection header 78 below the tank has a wash water connection 80. When the valve 82 is opened the water passes upwardly and outwardly through the envelopes carrying the filtered particles into the tank where they are then slurried over into the wash water troughs 48.

A filter constructed in accordance with the teachings of the invention has been used to separate nitric acid insoluble particles from the acidulate resulting from the digestion of phosphate rock by nitric acid. The digestion of the rock by the nitric acid produces a mixture of phosphoric acid, nitric acid, dissolved calcium nitrate, water and a number of insoluble impurities. The acidulate is a thick, muddy-appearing liquid in which the solids content ranges up to approximately 6 percent by weight. The high solids load of the liquid imparts exceptional difficulties of itself, but the filtration problem is further aggravated by the fact that the solids are extremely fine. Commonly, about 80 percent of the solids are less than 20 microns in size, ranging downwardly to submicron size. Large particles are relatively few, but even these particles have a maximum size of approximately 40 microns.

Notwithstanding the severity of the filtration task, such acidulate can be readily filtered in the filter apparatus of the present invention with the use of appropriate recycle quantities. Tests have shown that the present filter apparatus will remove 77 percent of the insoluble particles. A test run of the filter is set out in the following table:

| | |
|---|---|
| Run number | 4,244 |
| Approximate percent by weight solids in raw acidulate | 3.12 |
| Approximate percent by weight solids in blended feed | 0.366 |
| Approximate percent by weight solids in filtrate | 0.0832 |
| Approximate percent by weight solids removed | 77 |
| Filtrate recycle ratio: filtrate volume/raw acidulate volume | 7/1 |
| Approximate range solids size (microns) | 1–40 |
| Average filtration rate (ml./min./cm.²) | 0.033 |
| Filtration cycle in minutes | 85 |
| Total filtrate volume (liters) | 0.91 |
| Maximum opening cloth envelope (microns) | 471 |
| Cloth material | Polypropylene |
| Cloth weave | Monofilament |
| Filter sand (Tyler mesh) | −40+60 |
| Envelope sand (Tyler mesh) | −10+16 |
| Approximate filtration temperature (° C.) | 60–65 |
| Pressure drop during filtration (inches mercury) | 0–28 |
| Filter aid used | No |
| Drainage envelope (Fig. 6 construction) | Yes |

Similar tests have also been run on turbid water. Inasmuch as the solids load was very much less than in the case of the nitric acid filtration, recycle of the liquid being filtered was not necessary. The results of the tests are set out in the following table:

| Run number | 8,789 | 99,102 | 814 | 3,740 |
|---|---|---|---|---|
| P.p.m. solids in raw feed liquid nominal | 800 | 800 | 800 | 800 |
| Approximate p.p.m. solids in filtrate | 96 | 56 | 48 | 56 |
| Approximate percent solids removed | 88 | 93 | 94 | 93 |
| Approximate range solids size (microns) | 1–177 | 1–177 | 1–177 | 1–74 |
| Average filtration rate (ml./min./cm.²) | 1.22 | 0.39 | 0.33 | 1.46 |
| Filtration cycle in minutes | 63 | 252 | 1141 | 124 |
| Wash cycle (minutes) | 15 | 15 | 15 | 15 |
| Total filtrate volume (liters) | 25.0 | 31.5 | 122 | 58 |
| Sludge removal wash volume (liters) | 6.0 | 6.0 | 6.0 | 6.0 |
| Net filtrate volume (liters) | 25.0 | 31.5 | 122 | 58 |
| Maximum opening (microns) cloth envelope | 317 | 317 | 300 | 471 |
| Cloth material | | Polypropylene monofilament | | |
| Cloth weave | | | | |
| Filter sand (Tyler mesh) | −40 | −40 | −40+60 | −40+60 |
| Envelope sand (Tyler mesh) | −25+32 | −30+40 | −24+32 | −10+16 |
| Filtration temperature | | Ambient | | |
| Pressure drop during filtration (inches Hg) | 0–25 | 0–17 | 0–29 | 0–29 |
| Filter aid used | No | Yes | No | Yes |
| Drainage envelope (FIG. 6 construction) | No | No | Yes | Yes |

The present invention lends itself to a great many filtration tasks. It is particularly suitable for filtering situations where it is necessary or desirable to recover all of the values being removed from the mother liquor. Typical situations of this type occur in the filtration of many process liquors such as the phosphoric acid acidulate heretofore described. Because of the relatively shallow filtration zone of the present invention the volume of sand required is greatly minimized with the result that the ratio of sand volume to filter area is very low. This means that rinsing of the filter bed prior to washing in order to remove all recoverable values from the bed can be carried out easily and with a minimum of dilution. Consequently the cost of recovering these values is drastically reduced. In some processes the margin may be the difference between an economically feasible process and an uneconomical process.

In most of the foregoing tests filtration was accomplished without resort to filter aids of any sort and it is more economical to operate without them. However, wherever the addition of such aids would be beneficial such aids may be used.

Experience with the filter has shown that the filter cake that builds up in the filter sand, and which is porous, possesses a self-healing characteristic. If the filter cake should rupture at any point the flow of liquid at that point immediately increases. It has been found that when such ruptures occur the filter cake heals itself within a very short time and brings the flow of liquid and the clarity of the filtrate at that point back to normal by reestablishing the continuity of the filter cake.

What is claimed is:

1. A filter apparatus comprising
   a housing,
   a plurality of filter segments secured in said housing,
   each of said segments extending between opposing walls of said housing,
   each of said segments comprising a filtering medium and having a thickness substantially less than the length and height of the sides of said segments, said filtering medium being composed of very fine particles selected to provide for substantial filtration at the surfaces of said filter segments,
   a porous membrane entirely confining each side of each of said filter segments permitting fluid flow therethrough but preventing said filtering medium from escaping, said porous membrane comprising a porous material, openings in the material being smaller than said filtering medium,
   means spending said segments within said housing
   said filter segments being constructed and arranged and spaced from each other to provide alternate feed and drain channels substantially coextensive with the sides of adjacent filter segments, which channels have less resistance to fluid flow than the filter segments,
   a fluid source is open communication with said feed channels,
   an outlet manifold positioned adjacent to an end of said channels in open communication with said drain channels along substantial length of each of said drain channels,
   means securing said filter segments in place within said housing, said securing means maintaining the spaced-apart relation of said segments,
   blocking means across said feed channels preventing direct communication of the fluid to be filtered with said drain channels and fluid outlet manifold except through said filter segments, said blocking means across said feed channels being located across the ends of said feed channels adjacent to said outlet manifold, and
   said filter segments substantially surrounding said drain channels thereby preventing direct communication of said drain channels with said fluid source and said feed channels except through said filter segments.

2. The filter apparatus of claim 1 wherein said finely divided particulate filtering medium is sand.